United States Patent [19]

Bean et al.

[11] Patent Number: 5,490,261
[45] Date of Patent: Feb. 6, 1996

[54] INTERLOCK FOR CONTROLLING PROCESSOR OWNERSHIP OF PIPELINED DATA FOR A STORE IN CACHE

[75] Inventors: Bradford M. Bean, New Paltz; Anne E. Bierce, Poughkeepsie; Neal T. Christensen, Wappingers Falls; Leo J. Clark, Hopewell Junction; Steven T. Comfort, Poughkeepsie; Christine C. Jones, Poughkeepsie; Pak-Kin Mak, Poughkeepsie, all of N.Y.

[73] Assignee: International Business Machines Corporation, Armonk, N.Y.

[21] Appl. No.: 680,176

[22] Filed: Apr. 3, 1991

[51] Int. Cl.$^6$ .............................. G06F 12/08; G06F 12/00
[52] U.S. Cl. .................. 395/448; 395/457; 395/462; 395/470; 395/471; 395/472; 395/496; 364/243.45; 364/231.8; 364/246.8; 364/246.5; 364/243.41; 364/DIG. 1
[58] Field of Search .................... 395/425, 448, 395/457, 462, 471, 472, 496

[56] References Cited

U.S. PATENT DOCUMENTS 4,622,631  11/1986  Frank et al. ............................ 395/800
5,265,232  11/1993  Gannon et al. ........................ 395/425
5,276,848   1/1994  Gallagher et al. ..................... 395/425
5,276,852   1/1994  Callander et al. ..................... 395/425
5,317,720   5/1994  Stamm et al. ......................... 395/425

Primary Examiner—Rebecca L. Rudolph
Assistant Examiner—Reginald G. Bragdon
Attorney, Agent, or Firm—Bernard M. Goldman

[57] ABSTRACT

Insures data integrity in process ownership indications by providing an ownership interlock on the data units in a pipeline to a store-in type of cache. An ownership interlock prevents any processor ownership change to occur (i.e. exclusive or readonly ownership) for a cache data unit until all outstanding stores have been made in the cache data unit, after which the ownership may be changed. An ownership change may be signalled by a cross-invalidate (XI) signal to a processor. Outstanding stores are received by the pipeline after the stores are completed by a processor, and the outstanding stores output from the pipeline into a store-in cache. A continuous flow of stores is enabled into and out of the pipeline to expedite a change of ownership requested of a data unit in the cache. The continuous flow avoids having to stop a processor from putting stores into the pipeline and avoids forcing all outstanding stores out of the pipeline into the cache before indicating a change of processor ownership.

12 Claims, 6 Drawing Sheets

FIG. 2

L2 DIRECTORY ENTRY

| V | CH | | | LRU | CP-ID | ABS ADDR. IN L3 |
|---|----|---|---|-----|-------|-----------------|

FIG. 3

L1 DIRECTORY ENTRY

| V | EX/RO | | | LRU | STD ID | LOGICAL ADDR. |
|---|-------|---|---|-----|--------|---------------|

INTERLOCK FOR CONTROLLING PROCESSOR OWNERSHIP OF PIPELINED DATA FOR A STORE IN CACHE

INTRODUCTION

Any processor in a data processing system can be an exclusive owner of a data unit in the system storage hierarchy. Exclusive ownership of a data unit restricts to one of plural processors in the system the ability to write in the data unit, and only one processor at a time can have exclusive ownership. The exclusive ownership of a data unit can be changed from one processor to another processor at the request of a processor, and the ownership can be changed from exclusive to public ownership, and visa-versa. Public ownership allows all processors to read, but not to write in, the data unit. The invention insures data integrity in a data processing system by providing an ownership interlock on the data units in a store-in type of cache. The ownership interlock prevents any change to occur in the exclusive ownership of a cache data unit until all stores have been made in the cache data unit, and thereafter ownership may be changed.

Patent application Ser. No. 07/679,900, now U.S. Pat. No. 5,265,232 issued Nov. 23, 1993, filed on the same day as this application and owned by the same assignee, has all of its content fully incorporated herein by reference and is considered part of this specification.

BACKGROUND TO THE INVENTION

The store-in type of cache has been used in computer systems because it requires less bandwidth for its memory bus (between the memory and the cache) than is required by a store-through type of cache for the same frequency of processor accesses. Each cache location may be assigned to a processor request and receive a copy of a data unit fetched from system main memory or another cache in the system. With a store-in cache, a processor stores into a data unit in a cache location without storing into the correspondingly addressed data unit in main memory, so that the cache location may become the only location in the system containing the latest version of that data unit. The processor may make as many stores (changes) in the data unit as its executing program requires. The integrity of data in the system requires that the latest version of the data unit be used for any subsequent processing of the data unit. Exclusive ownership (authority) of a data unit has been required in prior store-in caches before allowing writing in the data unit.

A store-through type of cache is used only for fetching and all store accesses pass through it to the next level (another cache or main storage) in the system storage hierarchy. However, a store-through cache usually has stores performed in it as they pass through it, in order to maintain the latest version of data for obtaining the fastest fetching by its processor.

Exclusive ownership (authority) to change a cache data unit is assigned to a processor before it is allowed to perform its first store operation in the data unit. The assignment of processor ownership has been controlled by setting an exclusive flag bit in a cache directory (sometimes called a tag directory) associated with the respective data unit in the cache. The flag bit can be set to indicate either exclusive ownership or public ownership (sometimes called "read-only authority"). Exclusive ownership by a processor allows only it to write into the data unit. The public (read-only) ownership of a data unit does not allow any processor to store into that data unit, but allows each processor in the system to read that data unit which is then sharable by all processors.

U.S. Pat. No. 4,394,731 to Flusche et al teaches the use of exclusive/readonly flags in private processor directories used with private store-in caches and teaches the use of copy directories for processor identification. U.S. Pat. No. 4,394,731 used copies of all processor private L1 directories for identifying processor ownership and for controlling changes in the ownership of a data unit. Cross-interrogation was used among the copy directories to identify which processor had exclusive ownership of a data unit, and cross-invalidation was used from any identified processor's copy directory to its L1 cache to invalidate its conflicting address to assure exclusivity to a requesting processor, when changing the ownership from exclusive to public readonly ownership, or visa versa.

A store-in cache updates (writes in) a cache data unit which has its old version located at an associated address in main memory. When the updated data unit is no longer needed in the cache, it is castout of the cache by writing the updated cache version over the old version of the data unit at the associated address in main memory. The cast-out operation is done when an updated data unit is in a cache location which is to be reallocated to another data unit (e.g. fetched from another main memory address). For example, a processor may request to store into a data unit not currently in the cache. Then the requested data unit must be fetched from main memory (or from another cache) using the requested address and stored in a newly assigned cache location. The cache assignment of a location for the new data unit will be in a cache location not in current use if one can be found. However, only a limited number of cache locations exist, and all may currently contain updated data units. If all the assignable cache locations are currently occupied with changed data units, then one of them must be reassigned for the new request for a data unit not currently in the cache. Then a castout to main memory is required of the updated cache data unit before the reassigned cache location can be made available for use by the new request. The castout process is an example of a change of ownership in a data unit, because the castout data unit has its ownership changed from an exclusive processor ownership to a main memory ownership.

This problem is not generally applicable to a store-through type of cache, since any stores made in it will also have been made in its backing memory, which may be another cache (store-in or store-through) or may be main memory.

A change in the ownership of any data unit is controlled by the processor request process in a system. Only one of the plural processors in a multiprocessing (MP) system can have exclusive ownership (write authority) at any one time over any data unit. The exclusive ownership over any data unit may be changed from one processor to another when a different processor requests exclusive ownership. The prior mechanism for indicating exclusive ownership for a processor was to provide an exclusive (EX) flag bit in each L1 directory entry in a processor's private L1 cache; and the EX bit was set on to indicate which of the associated data units were "owned" by that processor. The reset state of the EX flag bit indicated public ownership, which was called "readonly authority" for the associated data unit that made it simultaneously available to all processors in the system. Thus, each valid data unit in any processor's private L1 cache had either exclusive ownership or public ownership.

There are many types of interlock controls in the prior art. One type of prior interlock control requires a castout for a changed cache data unit from a store-in cache to main storage to occur before a new data unit may be represented by the same cache directory entry, which will be overlayed for the new entry. Whether the data unit is changed has been indicated by a change flag bit in an accessed cache directory entry (indicating its associated data unit has been changed).

SUMMARY OF THE INVENTION

The invention deals with a high-speed pipelined computer system in which multiple machine cycles of delay intervenes between the time a store command is generated by a processor and the time its store is made in a target cache data unit. Such a delayed store command is called an "outstanding store" or a "pending store" during its flight time from its generation until it is stored in its targeted data unit in a store-in cache.

This invention requires that all outstanding changes be made in a data unit by a processor exclusively owning the data unit in a store-in-cache before the ownership of the data unit can be changed to a different processor. Outstanding stores are caused by a store command pipeline provided between a processor and the cache to buffer stores in a manner that improves the efficiency of processor operation, such as by freeing the processor to do other processing as soon as it generates each store command.

The object of the invention is to provide an ownership interlock that prevents changes in the ownership of a data unit in a store-in-cache until all outstanding stores have been made in the cache data unit.

This invention aids system efficiency by permitting a pipelined store stack to receive store requests from a processor in a continuous manner. Without this invention, the processor would need to stop sending store commands to the store stack when the processor receives an XI signal (for invalidating any XI addressed entry in its L1 cache directory) until all outstanding store commands then in the stack are completed in the cache to assure the integrity of data in the system. Such stoppage of a processor's store operations upon each received XI signal would reduce the rate at which stores are generated in the system and the rate stores could be received by an L2 cache, with a resulting significant loss in system efficiency.

Processor ownership over a data unit is considered to change: 1. when the requested data unit is found in a cache location which needs to be reassigned and have its ownership changed to the requesting processor in the cache directory; or 2. when the requested data unit is not found in the cache and a cache location containing a changed data unit is reassigned to the requested data unit, so that the changed data unit must be castout before the requested data unit is fetched into the same cache location, thereby changing the ownership of both the castout data unit and the requested data unit.

The invention may be used with different types of ownership indications for each data unit in a multiple processor system. Ownership may be expressed in a number of different ways, such as by the use of a CPU identifier (CPID) field in each directory entry to identify which of plural CPUs owns the associated data unit exclusively or whether the data unit is owned publicly by all CPUs. Or CPU ownership may be indicated by copies of CPU private L1 directories which are cross-interrogated by all CPU requests in the system to determine which CPU exclusively owns the requested data unit (by its copy directory indicating its exclusive ownership, or indicating the requested data unit is publicly owned). The CPID ownership-indicating method centralizes the system coherence control in a single shared directory which is not done in the copy directory method.

A cache data unit can have its ownership transferred from a currently owning processor to a requesting processor when the rules of ownership change are followed. When CPID is used in a single system directory, only that CPID field needs to be changed. But when copy directories are used to indicate ownership, a requested data unit has to be moved from one CPU's L1 cache, L1 directory and L1 copy directory (where the data unit is found) to the requesting CPU's L1 cache, L1 directory and copy directory.

These different data unit ownership methods may be used in a multiple processor system using only private CPU L1 caches and having a shared single system directory, or they may be used in a multiple processor system using private CPU L1 caches and a shared L2 cache having the shared single system directory. Both of these methods require the use of a change field in each directory entry of a cache to indicate if the associated data unit has been changed.

The preferred embodiment uses the CPID ownership-indicating method in a system using an L2 store-in-cache shared by a plurality of CPUs having private L1 store-through caches. The L2 cache uses hardware in the storage control element, SCE, to send a specific cross-invalidate (XI) signal to the current exclusive-owning processor indicated by the current CPID field in the L2 entry for changing the exclusive-ownership of a data unit. The XI receiving processor must provide an XI response to determine when all stores must be completed in the accessed L2 data unit before its CPID can be changed in the L2 directory entry. A store command may be made to any L2 entry currently indicating exclusive ownership by the CPU, and the store is made concurrently in both the requested L1 cache and the L2 cache, although it takes longer to make the store in the L2 cache than the L1 cache because of a pipelined store stack in the SCE for stacking plural store commands from each processor. Although the store stack delays making the stores in L2, it immediately frees up the processor so it can do another operation.

If the current CPID indicates a public ownership and the new request also wants public ownership of the same data unit, then no XI signalling is done and the L2 entry is not modified for the new request.

But if the current CPID indicates a public ownership, and a new request for the data unit wants exclusive ownership, then a general XI signal is sent to all CPUs having the publicly owned unit. No XI response back to the SCE is provided from the CPU receiving the general XI signal, and each CPU containing the XI addressed data unit of any XI signal invalidates it in its L1 cache. Then the L2 directory entry can have its CPID immediately set to the requesting CPU's exclusive CPID to change the ownership of its data unit from public to exclusive. Accordingly, no waiting period is needed for any response to a general XI signal from any CPU, as is the case with a specific XI signal.

A specific XI signal to the CPU requires the CPU to give up ownership of the XI addressed data unit. However, it does not require the CPU to give up ownership instantly. The CPU can finish up any required operations to that data unit before giving up ownership and sending an XI response.

A CPU presumes it has given up ownership of an L2 cache location at the time it sends an XI response signal. However, one or more of the CPU's outstanding stores to the XI addressed data unit may not yet have been made in the L2 cache, because these stores may still be in the pipeline, in a store queue, or in the stack, which delays the outstanding stores from being made immediately in the cache.

The outstanding stores in the store stack must be received by the intended cache data unit before its ownership is allowed to change. Data integrity in the system would be adversely affected if the ownership of a data unit were allowed to change before any outstanding stores in the stack were made in the data unit, because then the data unit may not have its latest value when it is fetched by a new owner.

Thus, before a reassignment of ownership to a cache data unit can be allowed, all outstanding stores in the store stack must be completed to the data unit addressed by the CPU which issued the stores, and that CPU must remain responsible for all changes it made up to the time it issued its XI response signal to indicate the precise point in its program execution where it signalled the termination its ability to make further data changes in that data unit.

This problem may occur with any store-in cache operating with pipelined processing between a CPU and a cache that causes a delay to stores being made in the cache after the CPU presumes it has ended its exclusive control over a cache location. Thus, the problem can occur with a CPU private cache (L1) when its stores are delayed by a pipeline operation, such as by having a pipelined input store queue. And this problem can occur with a store-in cache shared by a plurality of CPUs and is particularly pronounced in a shared L2 store-in cache operating with plural store-through L1 caches.

For example in an L2 shared cache, a CPU may be storing in a location in the L2 cache assigned to a first main memory address, when the cache location is reassigned to a different main memory location by the L2 replacement LRU controls. If the data unit had been changed in the reassigned cache location, that data unit needs to be castout to main memory (L3) to update its associated main memory location before it can be overlayed by newly requested data from a different main memory address. But that data unit cannot be cast-out until it is has completed storing all outstanding store commands issued to it before its CPU provided the XI response, which stores are still in the pipelined stack.

This invention aids system efficiency by permitting the store stack to receive input requests in a continuous manner. Without this invention, a CPU would need to stop sending store commands to its store stack when it provides an XI response until all outstanding stores then in the stack are made in the L2 cache in order to assure the integrity of system data. Such stoppage of the store stacks with each XI signal would reduce the rate at which stores would be received by the L2 cache, with a resulting significant loss in system efficiency.

DESCRIPTION OF THE DRAWINGS

FIG. 2 represents the form of an L2 directory entry in the L2 cache shown in FIG. 1.

FIG. 3 represents the form of an L1 directory entry in each L1 cache shown in FIG. 1.

DETAILED DESCRIPTION OF THE EMBODIMENT

Figure 1:
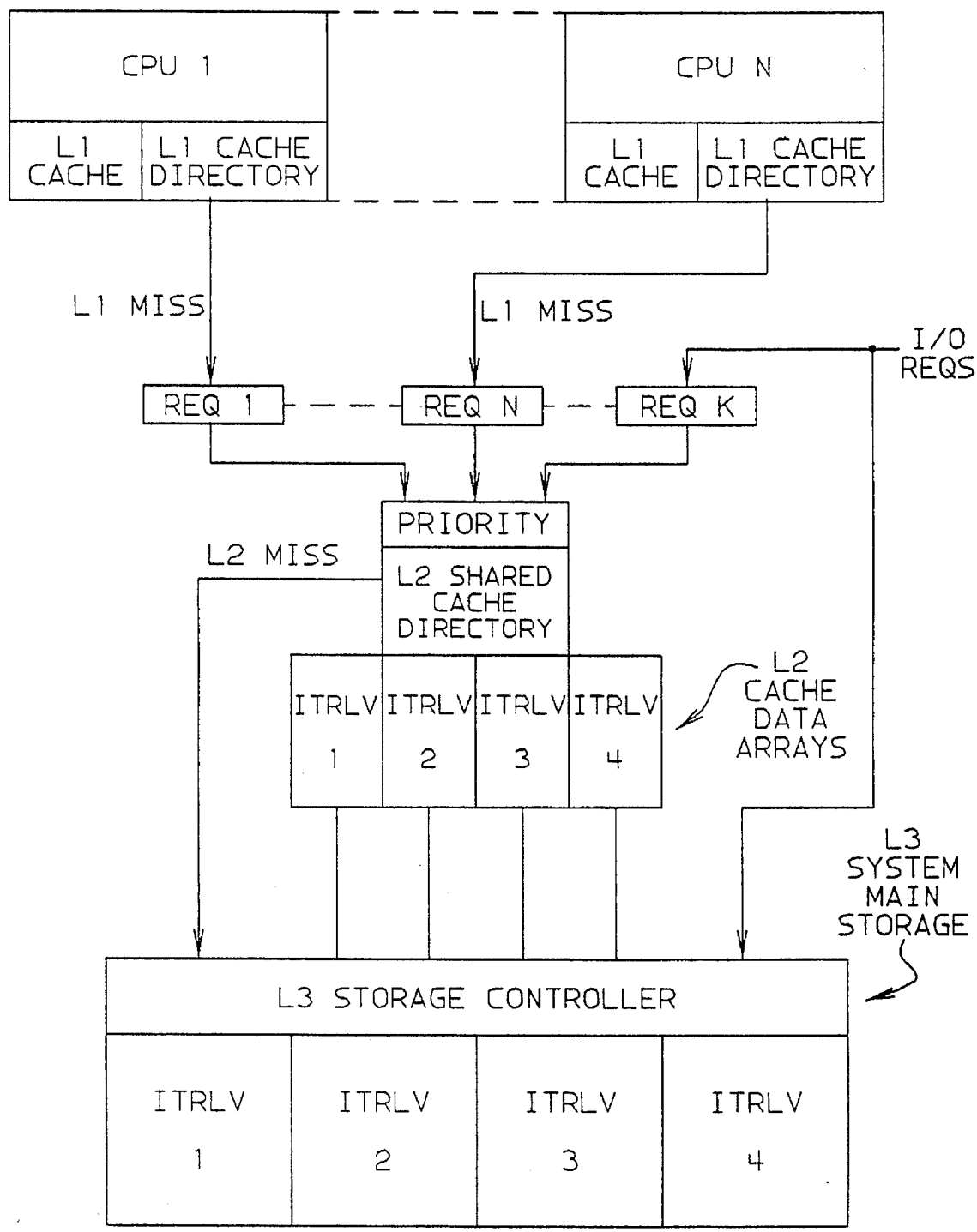
FIG. 1 Presents a data processing system containing the invention.

FIG. 1 represents a multiprocessor system (MP) containing central processing units (CPUs) 1-N in which each CPU contains at least one private cache and preferably has two private caches, an instruction cache and a data cache. Only the data cache can receive stores, and hence is the cache of concern to the subject invention. The instruction cache is readonly.

The CPU accesses its instructions from its instruction cache and accesses its operand data from its data cache. Both the data cache and instruction cache are used for fetching a data unit requested by their CPU. If a CPU fetch request does not find a requested data unit's address representation in a CPU's L1 cache directory, the L1 cache has a "miss", and the requested address is sent to a shared system cache (L2) to fetch the requested data unit.

Since the subject invention is concerned with store type accesses, the readonly instruction cache is ignored in the following discussion. Each L1 data cache is a store-through type of cache, and hereafter it is referred to as each CPU's L1 cache. If an instruction is to be stored into, it is done only in the instruction's data unit in the L2 cache, and then that data unit is fetched into the requesting instruction cache as a readonly data unit.

L2 requests comprise all L1 fetch misses and all I/O requests. If an L2 request is not found in the L2 cache, then the L2 cache has a "miss", and the requested address is sent to system main storage (L3), from which the requested data unit is fetched and is sent on the memory bus to the L2 cache, and the L1 data unit is sent to the requesting L1 cache generating the request. The data unit for the L1 cache need not be the same size as the data unit in the L2 cache which contains the L1 data unit. Thus each L1 data unit may be sub-multiple of an L2 data unit, or they may be the same size.

All CPU stores are made in L2 (as well as in L1). But stores are not requests to L2 but are handled as store commands to the caches. The reason is that all store commands are preceded by an L2 fetch request for obtaining the required data unit in both the L1 and L2 caches. Once the data unit exists in the caches, commands to store accomplish the store operation.

The L2 directory contains an input priority circuit that receives all requests to the L2 cache, i.e. for all CPUs and all I/O devices. The priority circuit selects one request at 'a time for accessing in the L2 cache directory. A high-order field in the selected request selects a row (congruence class) in the L2 directory (not shown) and a comparison with an address portion finds any assigned cache directory entry and associated cache data unit location, as is conventionally done in set associative caches so these cache contained items are not shown herein. Each L1 and L2 cache herein is presumed to be a 4-way set associative cache.

Each L2 directory entry contains the fields shown in FIG. 2, and each L1 directory entry contains the fields shown in FIG. 3. Each L2 entry contains a CPU identifier (CPID) field (e.g. three bits) which are combinatorially set to a value (e.g. 1 to 6) that can identify one CPU in the MP which is the current exclusive owner of the corresponding data unit in the L2 cache. A zero value in the CPID field indicates a public ownership for the corresponding L2 data unit.

If a requested address is not found in the addressed row in the L2 directory, a conventional LRU replacement circuit (not shown) allocates a replacement entry for each congruence class in which it candidates one of the four entries as the next entry in the congruence class for allocation to a requested data unit that must be fetched from L3 memory. Generally, the candidate entry is a currently invalid entry, but if there are no invalid entries, it selects the LRU entry of the four entries.

Before a requested data unit can be obtained from L3 and stored into the cache slot associated with a newly allocated L2 entry (the associated slot in a cache data array), any old data unit existing in that slot (represented by the current content of the L2 directory entry) must be checked in the directory entry to determine if it has changed data. This is done by checking the state of a change field (i.e. change bit) in the contents of the L2 entry before the entry is changed to represent the newly requested data unit. If the old data unit has been changed (as indicated by its CHG bit), it is the latest version of the old data unit which must be castout to the same address in main memory before the newly requested data unit can be stored in the associated location in the cache.

Thus, FIG. 1 generally illustrates a multiprocessor (MP) computer system which may contain the subject invention. It includes N number of CPUs each having a private store-through cache (L1) with its L1 cache directory. Each CPU accesses storage fetch requests in its L1 cache as long as it obtains cache hits indicating the requested data is available in its L1 cache.

However, sometimes requested data is not available in its L1 cache, and the cache then signals a L1 cache miss to the L2 cache. The fetch request is sent to the next level in the system storage hierarchy, which is the L2 cache in FIG. 1, to fetch the requested data unit, and is put into a request register, REQ 1-REQ N, associated with the requesting CPU. The CPU request also indicates the type of ownership which is being requested of the data unit to be fetched, which may be either exclusive or readonly.

After a data unit has been fetched into CPU's L1 cache from the L2 cache, the CPU may make store commands for storing data into the data unit. A store command usually does not overwrite the entire data unit in either the L1 or L2 cache, but writes only changed byte(s) into the data unit (which may, for example, contain dozens of bytes). This manner of writing into a data unit is well known in the art, using mark bits in the store command to represent the parts of a data unit to be changed by a given store command.

Also, an I/O request register, REQ K, receives all input and output (I/O) device requests to memory. An I/O request accesses the L2 cache since the latest version of a data unit may reside in the L2 cache, where it may be changed by the I/O request. If the I/O request is not in L2, it is then accessed in the L3 main memory without accessing the data unit into the L2 cache.

REQ 1-REQ K present their contained requests to the input priority circuit of the L2 shared cache. The presented requests are sequenced by the priority circuit, which presents one request at a time, to the L2 cache directory for accessing on a machine cycle or subcycle basis.

Figures 4, 5:
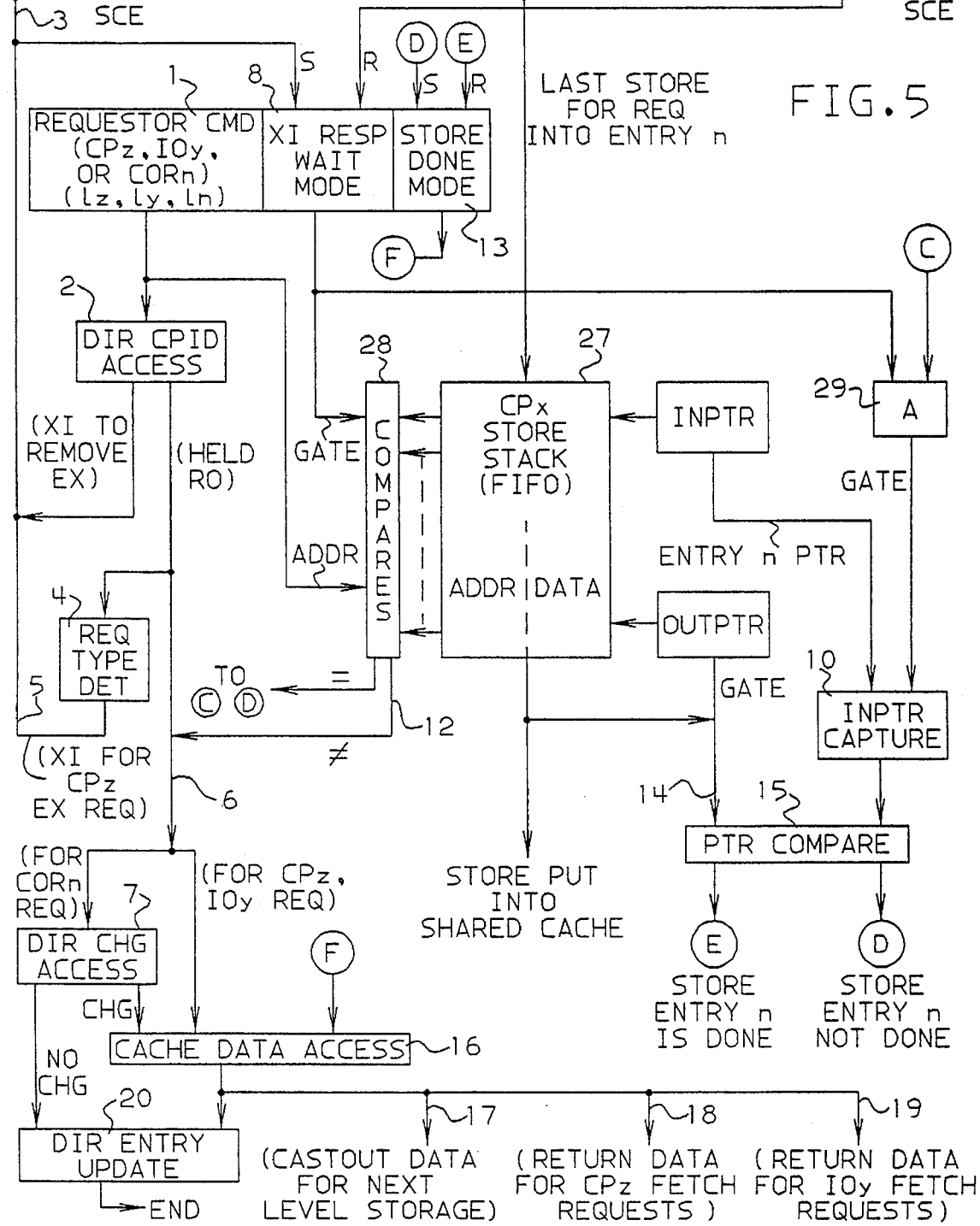
FIG. 4 represents CPU hardware in the system of FIG. 1 used in a preferred embodiment of the invention.
FIG. 5 represents SCE (storage control element) hardware in the system of FIG. 1 used in a preferred embodiment of the invention.

FIGS. 4 and 5 show the hardware pipeline for an embodiment of the invention contained in each of the CPUs and the SCE shown in FIG. 1. The store pipeline in FIGS. 4 and 5 connects the stores from any CPU to the shared L2 cache.

The nomenclature CPx is used in FIGS. 4 and 5 to designate any of the N number of CPUs that is currently receiving an XI signal from the SCE.

Each CPU store command causes storing in both the respective CPU's L1 cache and in the shared L2 cache. The manner of storing in L1 may be conventional. FIG. 4 shows a store queue 26 which receives the store commands from its CPx in FIFO order, and sends them to a store stack 27 (located in the SCE, which is the L2 cache and L3 main memory controller) which is in FIG. 5. The stack outputs its oldest store command to the L2 priority circuit for accessing in the L2 directory and L2 cache. Each store command in the store queue 26 and store stack 27 contains both the address and the data for a single store operation.

The FIFO order of handling store commands in stack 27 is maintained by inpointer and outpointer registers, INPTR & OUTPTR. INPTR locates the current entry in the stack for receiving the next store from queue 26. OUTPTR locates the oldest store in stack 27 to be outputted to the L2 cache. INPTR is incremented each time a store is received in the current inpointer location, and OUTPTR is incremented each time a store is outputted from the stack. Both the INPTR and OUTPTR wrap in the stack so that the stack never runs out of space for a next entry. This type of stack pointer control is conventional.

The CPz, CORn or IOy request command registers $1z$, $1n$ or $1y$ respectively receive the L1 CPU fetch requests, L2 cache LRU replacement requests and I/O device requests for accesses in the L2 cache. Each request command (i.e. requestor) puts into a request register the main memory address (or a representation thereof) of the requested data unit and the requested type of ownership (EX or RO). The registers $1z$, $1n$ and $1y$ represent different types of request registers, of which only one register is doing a request into the L2 cache at any one time in the embodiment. One of these registers is selected at a time by the L2 priority circuit for a current access cycle for accessing an entry in the L2 directory and its associated cache slot that contains the associated data unit.

Thus CPz request register $1z$ represents any L2 request register that receives any CPU request to L2. The subscript z indicates the CPU is a requesting CPU, while the subscript x is used herein to indicate any CPU which is receiving an XI signal.

The CORn (castout) register in represents any of plural castout request registers that receives a current castout request for L2. The subscript n indicates the assigned register of the plural castout registers assigned by an LRU replacement circuit for L2 (not shown) to receive the castout address. Replacement of the content of an L2 entry may be done in the conventional manner when a CPU request does not hit (i.e. misses) in the L2 directory.

The IOy register $1y$ represents any of plural registers that is selected by the L2 priority as its current request to the L2 directory. Only I/O requests that hit in L2 are used by this embodiment; an I/O request that does not hit (i.e. misses in the L2 directory) is not fetched into L2, but is then accessed in the L3 main memory in the conventional manner.

Whichever of the registers $1z$, $1n$ or $1y$ is currently selected has its address provided to comparators 28. And all addresses in stack 27 are provided in parallel to comparison circuits 28 which simultaneously compare all contained stack command addresses with the currently selected request address CPz, CORn or IOy being provided to the L2 cache.

An access 2 in the SCE tests the value of the CPID field in the currently accessed L2 directory entry in the detailed embodiment. If circuit 2 detects the tested CPID value is in the range of 1–6, it indicates an EX ownership by the identified CPU. But if the tested CPID is zero, access 2 has detected a public RO ownership for the data unit represented by currently selected L2 entry.

If exclusive ownership is detected by access 2, it invokes the generation of a specific cross-invalidate (XI) signal which is sent only to the one CPx identified by the tested CPID. A detected CPID value of from 1 to 6 in this embodiment indicates the one CPU in the system having exclusive ownership of the data unit associated with the currently selected L2 directory entry. A detected value of zero for the CPID indicates that data unit has public ownership and is therefore readonly. If public ownership is detected by access 2, it invokes the generation of a general XI signal which is sent to all CPUs except the requesting CPU.

The specific XI signal initiated by access 2 is sent only to the CPU identified by the CPID in the L2 directory entry. The specific XI signal includes the main memory address (or a representation thereof) for the affected data unit in the receiving processor's cache, an XI type indicator (specific or general), and an identifier (ID TAG) for this L2 request command (requestor) so that the SCE can determine which requestor is responsible for a received XI response. The specific XI type indicator also indicates whether the addressed data unit is to be invalidated or changed to public ownership. In the SCE, the sending of a specific XI signal sets an "XI response wait mode" latch 8 to "XI wait mode". The XI wait, caused by a specific XI signal, is ended when the SCE receives the XI response from the XI requestor that sent the XI signal getting the XI response.

The general XI signal initiated by access 2 is sent to all CPUs except the requesting CPU, and is put into all of the respective XI queues. The receiving CPUs will invalidate the XI addressed data unit, if it exists in the L1 cache, and does not provide any XI response.

As soon as any XI signal is sent for any requestor, the SCE can immediately service its next requestor, because the XI ID tag will allow correlation of each XI response with its requestor by the use of the requestor's ID tag.

A specific XI signal received by any CPx requires that CPU to stop sending stores to that XI addressed data unit, and give up exclusive ownership. However, the CPU can finish up any required operations to that data unit before giving up ownership. When the CPU reaches a point where it can give up ownership (this does not necessarily mean all store commands in store queue 26 to the XI addressed data unit are done), it outgates the XI signal from the XI queue 21. The XI queue 21 gates the invalidation addresses with the XI signal to a compare circuit 22 that compares the XI invalidation address in parallel with all addresses currently in the CPx store queue 26 and generates a compare or no compare signal. The XI invalidation address is also used to invalidate any entry in the CPx L1 cache equal to the XI invalidation address.

If circuit 22 provides a compare equal signal, it activates an "update queue" circuit 23 which stops store queue 26 from sending any store commands to the XI addressed data unit (stores to other data units may continue) and updates store queue 26 to mark those store command(s) to the XI addressed data unit. The "update queue" circuit 23 also activates an "XI response" circuit 24 to send an XI response signal to the SCE where it resets the "XI response wait mode" latch 8 to terminate the XI wait mode in the SCE.

If there are any marked store commands in store queue 26, they will start a process that will re-acquire exclusive ownership to that data unit (by sending a fetch exclusive command to the SCE). When exclusive ownership is re-obtained for the data unit the marked store commands are unmarked and they become eligible to be sent to the store stack 27.

If circuit 22 provides a no compare signal on its output G, it indicates there are no store commands in store queue 26 for the XI addressed data unit, and output signal G activates the "XI response" circuit 24 to send an XI response signal to the SCE where it resets the "XI response wait mode" latch 8 to terminate the XI wait mode in the SCE.

The reset of wait mode circuit 8 causes it to output a wait mode termination signal which gates comparator 28 to compare the current L2 request address with all addresses currently in the the CPx store stack 27 using a single cycle parallel compare operation. A compare-equal (cmpr) signal from circuit 28 to an AND gate 29 inputs the content of an INPTR register into a capture INPTR register 10 that captures the current location in stack 27 available for an input of a current CPU store command. Once the INPTR value is captured, CPx can continue to send store commands to the store stack which will change the INPTR value but not the captured INPTR 10. The captured INPTR value indicates the last location in the CPx store stack 27 which may contain the last store command from CPx for the requested data unit, and the OUTPTR value indicates the CPx store stack location having the oldest store from CPx. The OUTPTR value is being continuously incremented to continuously output its store command entries to update the L2 cache entries. The incrementing of OUTPTR will cause its contained pointer address to wrap around and finally become equal to the captured INPTR value.

The captured INPTR value is provided to a pointer comparison circuit 15 which compares it with the stack OUTPTR value as the OUTPTR is incremented to output the store commands to the L2 cache. As long as the OUTPTR does not compare equal with the INPTR, an output signal D is provided from pointer compare circuit 15 to set the "store done mode" latch 13 to indicate that the store stack outputting is not yet done. When the OUTPTR finally compares equal with the INPTR, an output signal E is provided from circuit 15 to reset the "store done mode" latch 13 to indicate that all possible store commands have been outputted from stack 27 into the cache.

When access 2 has found that public ownership exists for the currently accessed L2 entry, a current CPz request is detected by circuit 4 to determine if it wants exclusive or public ownership. If CPz wants exclusive ownership then general XI signalling is required to all other CPUs that contain that data unit. (However if the CPUs containing the data unit are specifically known, the general XI signalling need only be sent to them without being sent to the CPUs known not to contain the data unit). If CPz wants public ownership then no XI signalling is required.

All IOy requests are handled by access 2 merely sending a general XI invalidate signal, which prevents any CPU from interfering with any I/O access in the L2 cache.

Thus, the general XI signal from access 2 is used when there there is no need for any XI response from any of the plural CPUs which may contain the data unit, since none can be doing store commands and all that is needed is L1 invalidation.

If a "no compare" output should be provided by stack compare circuits 12 (indicating no store commands from CPx exist in the stack) or the public ownership RO indication 6 exists from circuit 2 in the currently accessed L2 directory entry, the access operations represented by boxes 7, 16 and 20 are used. In all of these cases, there are no outstanding stores because the public ownership of the current data unit prevents stores from happening.

The change field in an accessed public entry is detected only for a CORn request because it is needed for castout control. For CPz and IOy requests, no castout is done but instead the accessed entry is transferred to CPz and IOy requests regardless of the state of the change field which therefore is not detected. Hence, change access circuit 7 detects the change field in the current directory entry only for a CORn request, change access circuit 7 is not used for a CPz or IOy request.

But if for a CORn request, change access circuit 7 finds the change field indicates no change, then there is no need for a castout (since the data unit is the same in main memory L3), and the directory entry update means 20 can immediately update the directory entry by overlaying its content with information from the CPz request that caused the respective CORn request.

Thus, for a CORn request, if change access circuit 7 detects the change bit is set on in the current directory entry, data unit access 16 is needed to access the updated associated data unit from the cache data arrays for the request, i.e. a switch 17 sends the data unit (castout) to the next storage level L3. For a CPz or IOy request, access 16 can immediately obtain the associated data unit from the cache data arrays for the request, i.e. a switch 18 sends the data unit to CPz for a CPU request, and switch 19 sends the data unit to the requesting channel IOy.

Directory entry update means 20 is immediately used for a CORn request that finds no change in the associated data unit. But if the directory entry update means 20 is being used for a CPz request, then the update of directory entry content by means 20 is delayed until after the castout has been completed (for system recovery reasons the initial content of the entry may be needed if a system failure should occur before the castout is completed).

The timing delay for the cache data access 16 is controlled by the output F from the "store done" latch 13 when it is reset by a compare-equal signal E from PTR a compare circuit 15 (when the INPTR and OUTPTR are equal). All CPz store command entries to the requested data unit in stack 27 will have been flushed out to the cache when circuit 15 signals its output signal E, since then the OUTPTR will have revolved back to the captured INPTR starting point for the stack output operation, and then cache data access 16 may be initiated.

Figure 6:
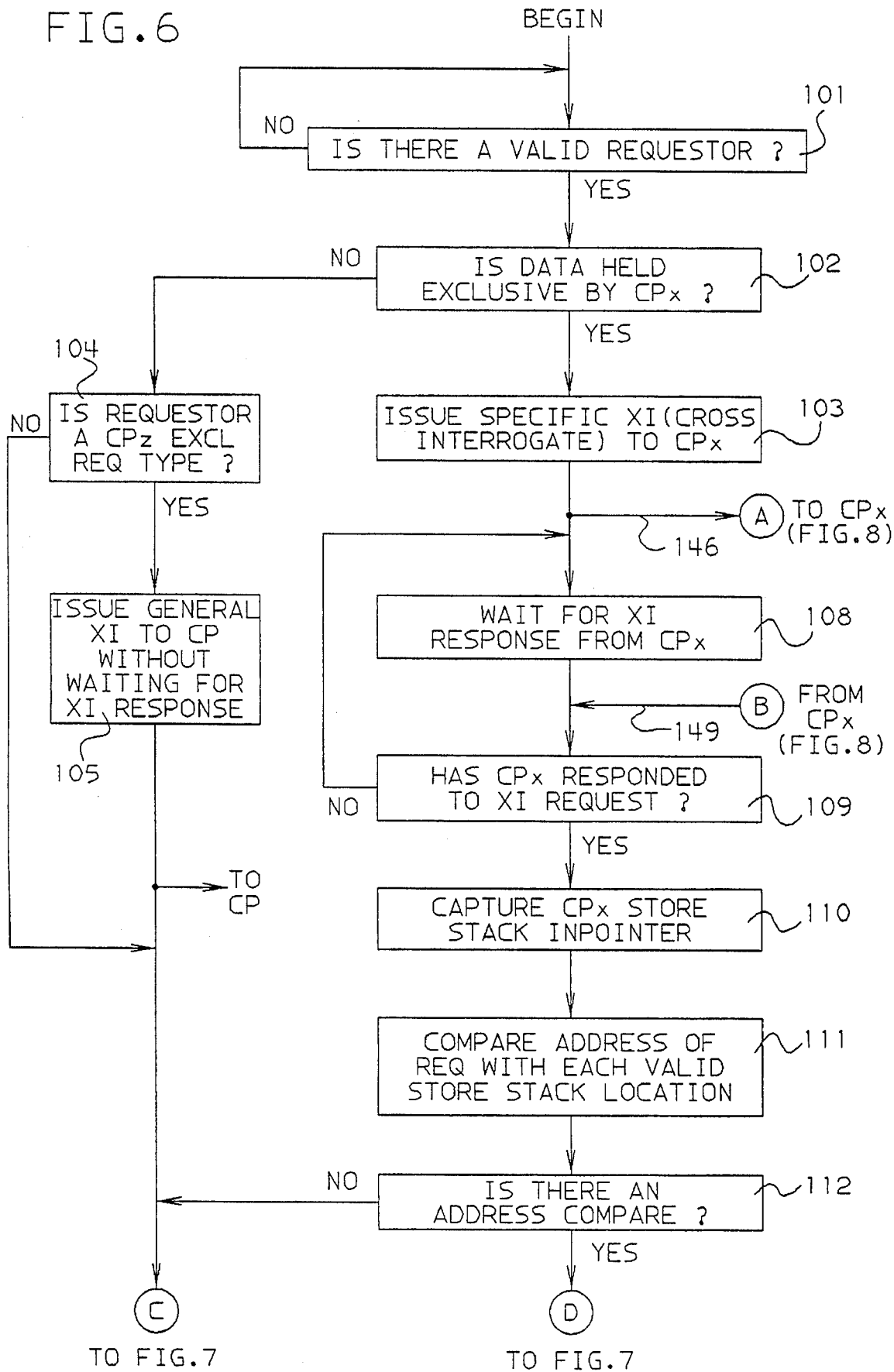
FIG. 6, FIG. 7 and FIG. 8 provide flow diagrams of a process that operates on the hardware shown in FIGS. 1 through 5 for performing the preferred embodiment of the invention.
Figure 7:
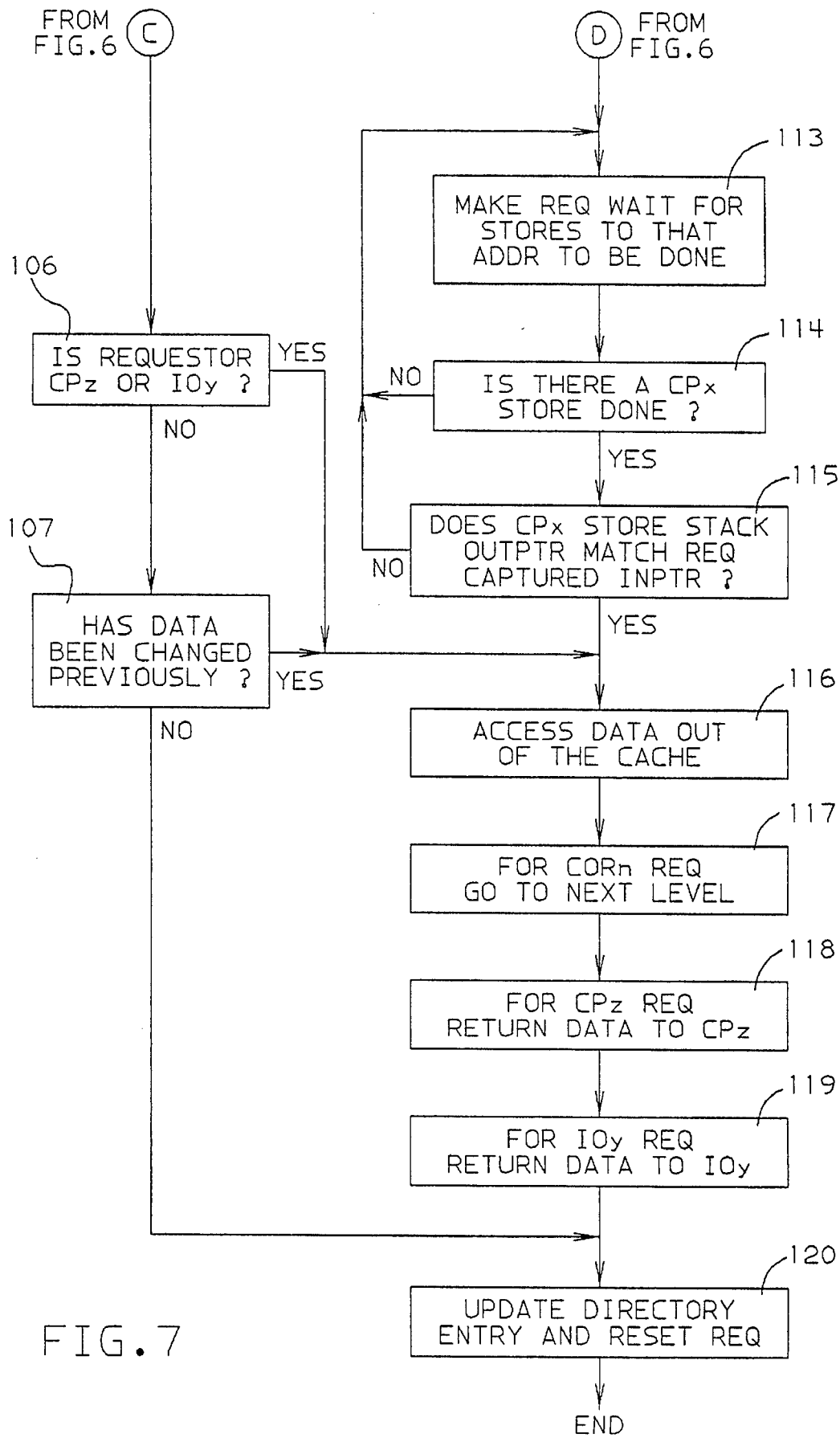
Figure 8:
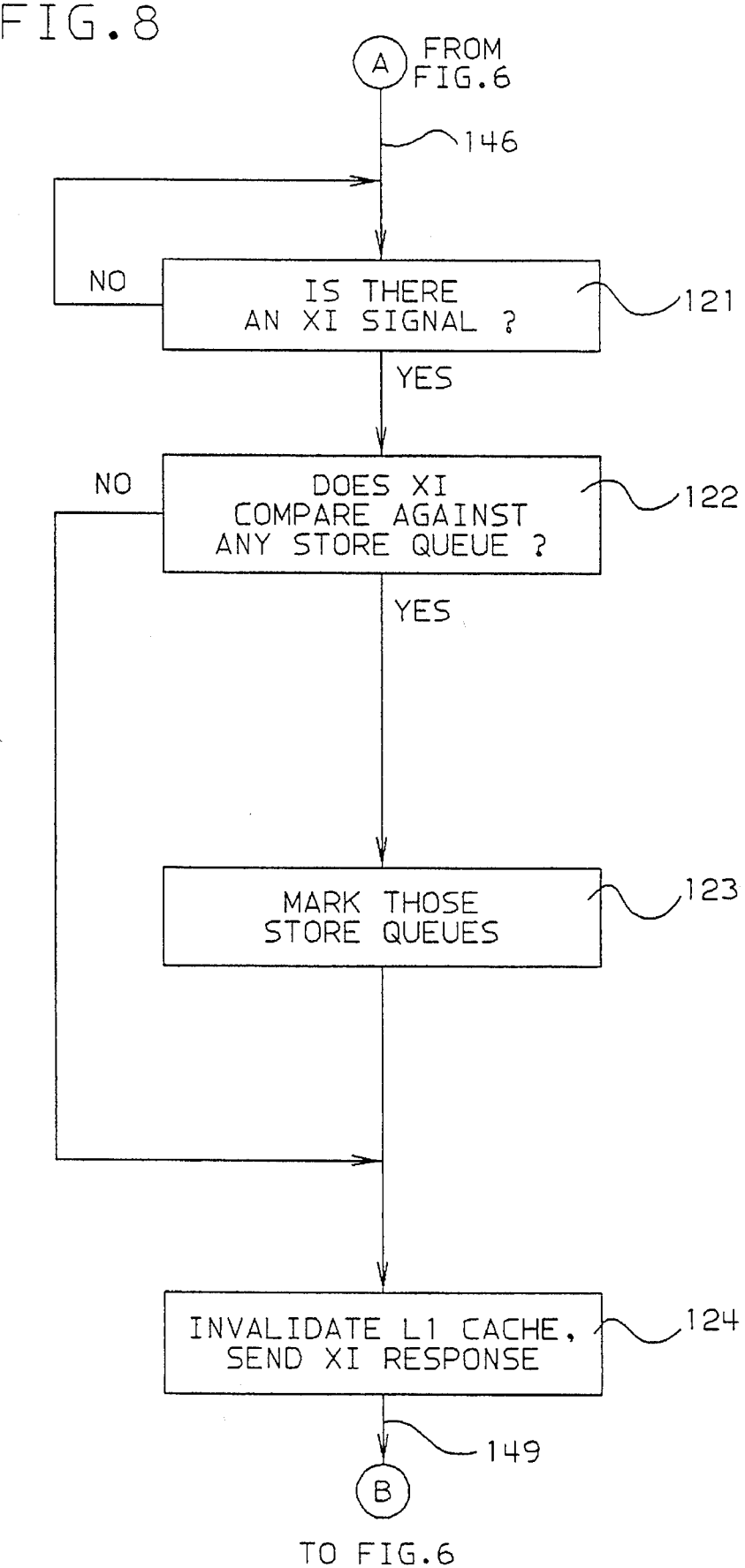

Process Operations in FIGS. 6, 7 and 8

The reference numbers in FIGS. 6, 7 and 8 are functionally related to the reference numbers used in FIGS. 4 and 5, wherein 100 has been added to the latter reference numbers to generate the former reference numbers. The following steps in the novel process disclosed herein also are related to the reference numbers in FIGS. 4 and 5.

(101) A Requestor (address in castout register In, CPU fetch request register 1z or IO fetch request register IOy) is valid and selected by the L2 priority for the current L2 cycle.

(102) The directory entry accessed by the requestor contains the ownership information and is accessed to determine if data is held exclusive or read-only.

(103) The data is found to be held exclusively by a CPx, and therefore CPx must be sent an specific XI signal that its exclusive ownership is being rescinded. This cross-interrogation signalling also includes the identity (ID) of the Requestor which is returned to the SCE when CPx issues its completion response (its XI response).

(104) The directory entry for the currently accessed L2 data unit indicates it is publicly owned and if CPz did not request exclusive ownership, no XI signalling is needed. See FIG. 6.

(105) When a CPz requests exclusive ownership of a data unit, and it is found to be publicly owned among the CPUs, the SCE sends a general XI signal to all CPUs (excluding CPz) to invalidate all L1 copies of the data. Since the requested data unit is publicly owned, there is no need for the requesting CPz to wait for an XI response before accessing the data unit, since no outstanding stores exist in the stack. The CPz requestor then gets exclusive ownership of its fetched data unit.

(106) For CORn castout requests of a public data unit, its directory change flag field is checked to determine if a castout is really needed to preserve the latest version of the data unit in main memory since the data unit in the associated cache slot will be destroyed, but if it has not been changed it already has an exact copy in main memory. For CPz and IOy exclusive fetch request hits to a public data unit, the change field does not need to be checked since the associated data unit (whether changed or not) only has its ownership changed by the current request and is not otherwise affected.

(107) Here, a CORn request has its change field checked for a public data unit. Only if the associated data unit is changed, is a castout required.

(108) At this time the L2 cache is waiting for an XI response from the specified CPx, because it has received a specific XI request. The XI response wait mode latch is set by a specific XI signal, but it is not set by a general XI signal because it does not generate an XI response.

(109) CPx issues an XI response to its received XI signal. In responding, CPx indicates it will not provide any more stores to the currently accessed L2 data unit, and CPx has given up its exclusive ownership to that data unit. A requestor ID TAG is returned with its XI response which is then decoded in the SCE and sent to the proper requestor (CPz, IOy or CORn request register).

(110) Upon reception of the CPx response, the value of the store stack inpointer (INPTR) identifying the most recent store command entry from CPx is captured (which is the last possible store command from CPx for the currently accessed L2 data unit) for possible use by the requestor.

(111) A parallel address compare is done between the requestor address and the addresses in all store commands in the CPx store stack to determine if no CPx store command exists to the requestor's address.

(112) Results of the parallel address compare indicate if no compare was found, which indicates that no stores exist that could interfere with the requested change of ownership. If any compare is found, the requestor must wait for all stores in the CPx stack to be completed up to the captured INPTR before the requested change of ownership can be made.

(113) If any store compare is indicated by step 12, the requestor must wait for the last store command to the addressed data unit in the CPx stack to be completed in the L2 cache. See FIG. 7.

(114) To determine when the last store to the addressed data unit has been completed from the CPx stack, a pointer address compare is done between the captured INPTR and the incremented outpointer (OUTPTR), which determines when all CPx store commands in the CPx store stack have been made into their addressed L2 cache data units.

(115) The completion of the last possibly pertinent store in the stack is indicated when the captured INPTR equals the incremented OUTPTR. Then it is safe to change ownership for the requested data unit, and any caused castout data unit. Before the last store position is reached by the OUTPTR, the pointer compare outputs a signal D to set the store done latch 13 to its store-not-done state.

(116) The requested ownership change is initiated by output E from the pointer compare resetting the store-done mode latch, which then provides the store-done signal F that provides cache data access 16 for the requested data unit.

(117) For a CORn type of requestor, the cache data access 16 provides the data unit for a castout to the next level storage, since all exclusive conflict has been resolved for the data unit. And CORn is released for another castout request.

(118) For a CPz request, the data unit of cache data access 16 is sent to the CPz requestor, since any exclusive conflict has been resolved for the data unit. And the CPz request register is released for another CPU request.

(119) For an IOy request, the data unit of cache data access 16 is sent to the IOy requestor, since any exclusive conflict has been resolved. And the IOy request register is released for another IO request to memory.

(120) The accessed directory entry is updated. For a CORn requestor, the entry is made available for requested new data. For an IOy fetch request, public ownership is set in the directory entry. For a CPz request, the requested exclusive or public ownership is set into the directory entry.

(121) CPx checks its XI queue 21 and finds an XI signal needing to be handled, and outgates the XI signal from XI queue 21. See FIG. 8.

(122) CPx compares the address in the XI signal with the addresses of the store commands in its store queue 26. If no store command addresses in queue 26 compares equal to the XI address then no store commands in queue 26 are marked.

(123) If any store commands compare equal with the XI signal, they are marked to indicate that data unit is no longer owned exclusive. CPx must re-acquire exclusive ownership of this data unit before it can send the marked store commands to the store stack 27.

(124) The CPx L1 cache directory is searched for the address with the XI signal, and any entry with that address is marked invalid, and an XI response signal is sent to the SCE.

In CPx after the ownership is changed for the accessed data unit:

(A) If any store is marked in the CPx store queue 26, its data unit is identified in the marked entry and it is refetched and re-executed.

(B) Continue normal processing in CPx.

Thus, while the invention has been described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. Ownership change control for data units in a cache shared by a plurality of processors in a data processing system, in which the processors can independently execute different instruction streams, the ownership change control comprising:

each processor of the plurality of processors having a private cache for receiving stores generated by an associated processor's instruction stream;

a plurality of processor store pipelines for storing data into the shared cache generated by the processor instruction streams, each store pipeline associated with a respective one of the processors, each pipeline containing a plurality of pipeline entries for receiving data from a respective processor to be stored into addressed locations in data units in the shared cache, each entry in a pipeline being capable of holding an address and data to be stored in a data unit in the shared cache;

an ownership indication for each data unit in the shared cache for identifying any processor having exclusive ownership of valid data stored in a data unit in the shared cache while the data unit is allowed to be changed by a processor indicated as having exclusive ownership;

pipeline requesting means to request the shared cache to store data from an oldest entry in each pipeline into a data unit in the shared cache, a newest entry and an oldest entry in each pipeline being pipeline entries containing data most recently received and least recently received, respectively, by the pipeline;

a shared cache controller for signalling to a processor identified as owning a requested data unit in the shared cache when the pipeline of an other processor requests to store data in the requested data unit in the shared cache, the processor providing a response signal for indicating if the pipeline associated with the processor does or does not contain store data for the requested data unit;

the shared cache controller immediately changing the exclusive ownership identification of the requested data unit from the processor to the other processor to allow immediate store access of the requested data unit by the pipeline of the other processor; and, each processor executing instructions that put stores in an associated pipeline simultaneously while the shared cache controller is processing an ownership change for a prior store in any of the pipelines.

2. Ownership change control for a data unit in a cache shared by a plurality of processors in a data processing system, in which each processor can be independently executing store operands in different instruction streams, the ownership change control as defined in claim 1 further comprising:

the processor marking its newest entry (marked entry) addressing the requested data unit in the associated pipeline to define a set of one or more entries between the marked entry and an oldest entry in the pipeline, if the processor sends a response indicating the associated pipeline has one or more entries containing data to be stored in the shared cache;

the pipeline storing into the shared cache the data in each entry in the set; and the shared cache controller changing the exclusive ownership identification of the requested data unit from the processor to the other processor when each entry in the set has been stored in the shared cache, each processor executing instructions that store data in the pipelines while the pipelines are storing data into the shared cache.

3. Ownership change control for a requested data unit in a cache of a data processing system as defined in claim 2, further comprising:

means for maintaining an inpointer locating the newest entry provided in the associated pipeline by the processor to mark the newest entry as the marked entry when the processor signals a response to the signal from the pipeline requesting means;

means for comparing the inpointer with an outpointer that locates the oldest entry in the associated pipeline currently being outputted to the shared cache; and the processor signalling when the inpointer equals the outpointer to indicate when the ownership of the requested data unit is to be changed if at least one entry addresses the requested data unit in the associated pipeline.

4. Ownership change control for a data unit in a cache of a data processing system as defined in claim 3, further comprising:

directory means for the shared cache having a plurality of entries in which each directory entry is capable of representing an associated data unit in the shared cache, and each directory entry indicating an ownership for the associated data unit as exclusive to an identified processor or as public to all processors in the system.

5. Ownership change control for a data unit in a cache of a data processing system as defined in claim 4, further comprising:

a processor identifier being provided in each directory entry to indicate which of the plurality of processors is a current owner of a contained data unit when exclusive ownership is indicated.

6. Ownership change control for a data unit in a cache of a data processing system as defined in claim 5, further comprising:

the shared cache controller signalling all other processors in the system with a general XI (cross-invalidate) signal to invalidate any copy of a requested data unit currently indicated in any other processor's private cache as being publicly owned when exclusive ownership is requested of the data unit.

7. Ownership change control for a data unit in a cache of a data processing system as defined in claim 6, further comprising:

means for recognizing if a request for exclusive ownership is from a processor (CPU) and changing an ownership identifier to identify the requesting CPU in an associated directory entry accessed for the request by the CPU.

8. Ownership change control for a data unit in a cache of a data processing system as defined in claim 6, further comprising:

means for recognizing if a store request to a shared cache is from an input/output (I/O) channel and sending a general XI signal to all processors in the system to invalidate any copy of the requested data unit in the shared cache and in any processor's private cache.

9. Ownership change control for a data unit in a cache of a data processing system as defined in claim 6, further comprising:

means for recognizing if a read-only fetch request for a data unit is from a requesting processor or input/output (I/O) channel and allowing fetch access to the requested data unit without sending any XI signal to any processor if the indicated ownership of the requested data unit is found to be public in a directory entry accessed by the requesting processor or I/O channel.

10. Ownership change control for a data unit in a cache of a data processing system as defined in claim 6, further comprising:

the shared cache controller signalling an invalidation signal only to a processor indicated in a directory entry accessed by a requesting processor as being the exclusive owner of a requested data unit, and means for updating the associated directory entry to indicate exclusive ownership by the requesting processor.

11. Ownership change control for a data unit in a cache of a data processing system as defined in claim 6, further comprising:

the shared cache controller signalling only to a processor indicated as being the exclusive owner of the requested data unit in a directory entry accessed by a castout request;

means for detecting if the accessed directory entry indicates the requested data unit has been changed;

means for casting out the requested data unit; and means for updating the accessed directory entry after the castout to indicate exclusive ownership by a requesting processor when the ownership is allowed to be changed.

12. Ownership change control for a data unit in a cache of a data processing system as defined in claim 6, further comprising:

the shared cache controller signalling only to a processor indicated as being the exclusive owner of the requested data unit in a shared directory entry accessed by a castout request;

means for detecting if the shared directory entry indicates the requested data unit has not been changed; and means for updating the shared directory entry without any castout occurring to indicate exclusive ownership by a requesting processor when the ownership is allowed to be changed.

* * * * *